(12) United States Patent
Williams et al.

(10) Patent No.: US 7,100,689 B2
(45) Date of Patent: Sep. 5, 2006

(54) SENSOR APPARATUS AND METHOD OF USING SAME

(75) Inventors: John R. Williams, Lexington, MA (US); Peter W. Sebelius, Chelmsford, MA (US); Joel R. Parry, Jamaica Plain, MA (US); William D. Coskren, North Reading, MA (US)

(73) Assignee: The Charles Stark Draper Laboratory Inc., Cambridge, MA (US)

( * ) Notice: Subject to any disclaimer, the term of this patent is extended or adjusted under 35 U.S.C. 154(b) by 249 days.

(21) Appl. No.: 10/745,391

(22) Filed: Dec. 23, 2003

(65) Prior Publication Data

US 2004/0159149 A1    Aug. 19, 2004

Related U.S. Application Data

(60) Provisional application No. 60/436,061, filed on Dec. 23, 2002.

(51) Int. Cl.
*E21B 47/00* (2006.01)
*E21B 49/08* (2006.01)

(52) U.S. Cl. ............... 166/264; 166/66; 73/152.23; 73/152.19

(58) Field of Classification Search ............ 73/152.23, 73/152.24, 152.25, 152.26, 152.19; 166/245
See application file for complete search history.

(56) References Cited

U.S. PATENT DOCUMENTS

| | | | |
|---|---|---|---|
| 4,154,660 A | 5/1979 | Micko | |
| 4,788,544 A | 11/1988 | Howard | |
| 5,117,685 A | 6/1992 | Goldschild | |
| 5,147,561 A | 9/1992 | Burge et al. | |
| 5,351,532 A | 10/1994 | Hager | |
| 6,098,020 A | 8/2000 | den Boer | |
| 6,176,323 B1 | 1/2001 | Weirich et al. | |
| 6,206,108 B1 | 3/2001 | MacDonald et al. | |
| 6,220,371 B1 | 4/2001 | Sharma et al. | |
| 6,272,938 B1 | 8/2001 | Baghel et al. | |
| 6,478,950 B1 | 11/2002 | Peat et al. | |
| 6,490,916 B1 | 12/2002 | Goodwin et al. | |
| 6,633,236 B1 | 10/2003 | Vinegar et al. | |
| 2002/0189338 A1* | 12/2002 | Kruspe et al. | 73/152.43 |
| 2003/0042016 A1 | 3/2003 | Vinegar et al. | |
| 2003/0089623 A1 | 5/2003 | Peat et al. | |
| 2004/0045350 A1 | 3/2004 | Jones et al. | |

FOREIGN PATENT DOCUMENTS

| | | |
|---|---|---|
| EP | 0 695 853 | 2/1996 |
| WO | WO 98/17894 | 4/1998 |
| WO | WO 98/50680 | 11/1998 |
| WO | WO 99/00575 | 1/1999 |
| WO | WO 01/07755 | 2/2001 |
| WO | WO 01/63094 | 8/2001 |
| WO | WO 01/65248 | 9/2001 |
| WO | WO 01/77628 | 10/2001 |
| WO | WO 01/98630 | 12/2001 |

* cited by examiner

*Primary Examiner*—David Bagnell
*Assistant Examiner*—Nicole A Coy
(74) *Attorney, Agent, or Firm*—Goodwin Procter LLP

(57) ABSTRACT

The invention relates to a system and method for sensing the characteristics of a fluid in a sub-surface formation. In one embodiment, the invention relates to a sensor apparatus for sensing a chemical in a vapor emitted by a sub-surface fluid sample. In various configurations, the apparatus senses the presence and/or percentage of water, the presence of a gas, an oil/gas ratio, an aliphatic/aromatic hydrocarbon ratio, and/or the presence of corrosive or poisonous chemicals.

46 Claims, 10 Drawing Sheets

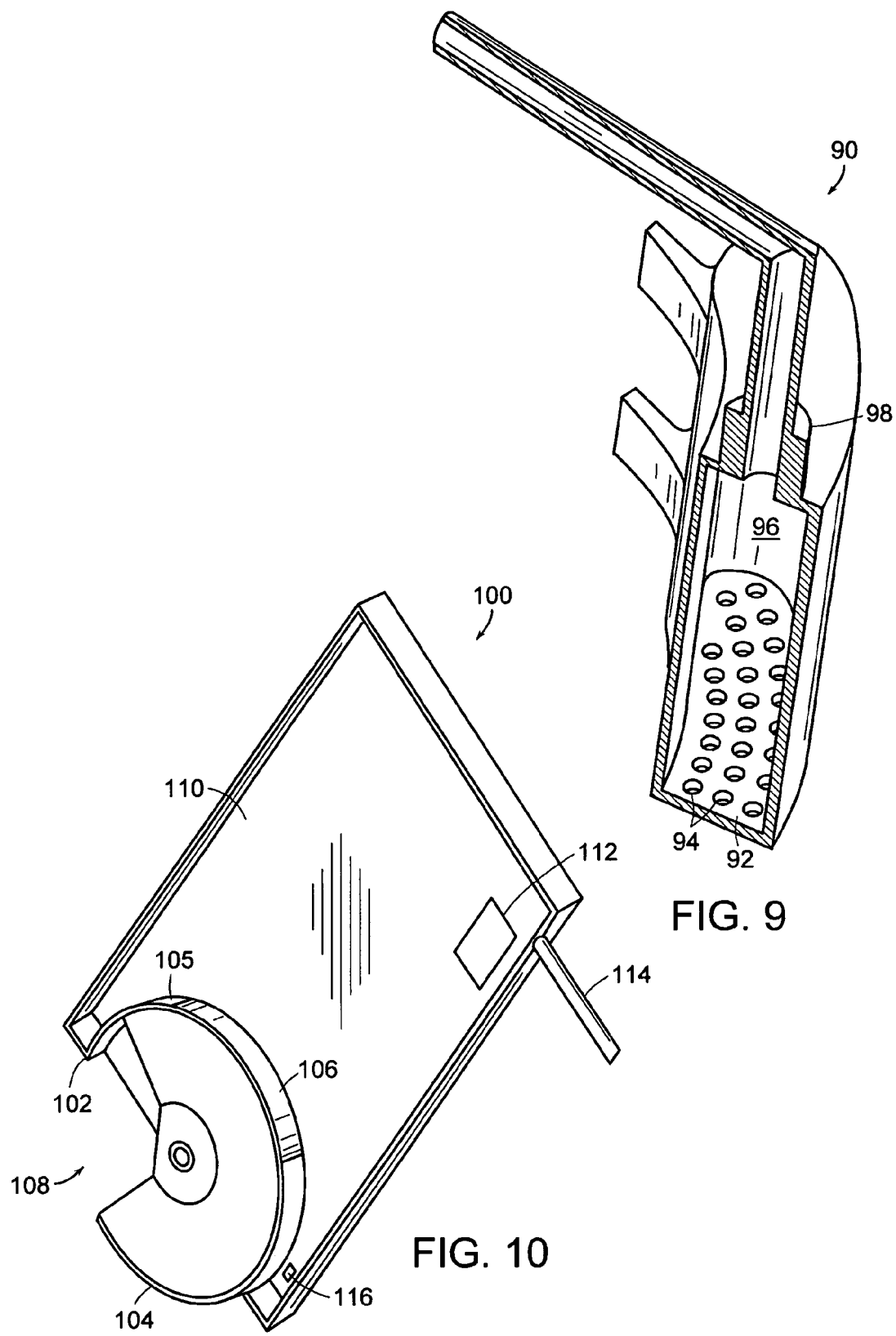

SENSOR APPARATUS AND METHOD OF USING SAME

CROSS-REFERENCE TO RELATED APPLICATION

This application incorporates by reference, and claims priority to and the benefit of, Provisional U.S. patent application Ser. No. 60/436,061, which was filed on Dec. 23, 2002.

TECHNICAL FIELD

The invention relates generally to systems and methods for sensing the characteristics of a fluid in a sub-surface formation. In particular, the invention relates to a system for determining the chemical characteristics of a fluid located in a wellbore during the drilling of the wellbore.

BACKGROUND INFORMATION

During the drilling of a wellbore, it is often necessary to determine certain physical and chemical characteristics of sub-surface drilling fluids. Examples of sub-surface fluid characteristics that are of particular importance to oil well operators include, for example, the presence and/or percentage of water, the presence of a gas (e.g., methane), the oil/gas ratio, the aliphatic/aromatic hydrocarbon ratio, and the presence of corrosive or poisonous chemicals (e.g., hydrogen sulfide). Current methods for analyzing wellbore fluids typically require transporting a fluid sample to the surface. In deep wells, this process can be both costly and time-consuming.

To address this problem, downhole sensing systems have been developed in which a sensing system located within the wellbore transmits real-time data to the surface. Typically, existing downhole systems include one or more sensors that are placed in direct contact with the wellbore fluid. In deep wells, temperatures within the wellbore can reach as high as 450° F. and pressures can exceed 30,000 psi, which tends to limit the operational life of existing downhole sensors. Furthermore, the sensitivity of existing sensors is often sacrificed in order to increase their resistance to the harsh conditions within the wellbore.

There is, therefore, a need for a downhole sensor system for sensing the characteristics of a fluid in a sub-surface formation that can withstand prolonged exposure to harsh environmental conditions.

SUMMARY OF THE INVENTION

The present invention avoids damage to the sensors in downhole equipment by isolating the sensors from the harsh wellbore environment. Generally, the invention involves one or more sensors that sense a chemical in a vapor emitted by a sub-surface fluid sample.

In one aspect, the invention relates to an apparatus for sensing a chemical in a sub-surface fluid. The apparatus includes a chamber, a first inlet disposed on the chamber for passing a sub-surface fluid sample into the chamber, and at least one sensor disposed within the chamber. The sensor is isolated from the first inlet and the sub-surface fluid sample and is capable of sensing a chemical in a vapor emitted by the sub-surface fluid sample. In some embodiments, the sub-surface fluid sample is at least one of gas, oil, and water, and particularly crude oil.

In another aspect, the invention relates to a system for sensing a chemical in a sub-surface fluid. The system includes a drill string and an apparatus for sensing a chemical in a sub-surface fluid. The apparatus includes a chamber, a first inlet disposed on the chamber for passing a sub-surface fluid sample into the chamber, and at least one sensor disposed within the chamber. Alternatively, the system may include a drill casing and an apparatus for sensing a chemical in a sub-surface fluid.

In various embodiments, the apparatus includes an outlet disposed on the chamber including, in one embodiment, a check valve. In some embodiments, the apparatus includes a second inlet disposed on the chamber for passing a purging fluid (e.g., nitrogen gas) into the chamber and/or a gas source (e.g., a gas cylinder or bottle) in fluid communication with the second inlet. In some embodiments, the first inlet comprises a rotatable wheel that includes at least one blade. In some versions of this embodiment, a power source rotates the wheel. In other embodiments, the first inlet is a valve.

In some embodiments, the sensor is at least one of a hydrocarbon sensor, a water sensor, a pH sensor, and a hydrogen sulfide sensor. In some embodiments, the apparatus includes a fluid level sensor disposed within the chamber. In some embodiments, the apparatus includes at least one sensor disposed outside the chamber, for example, a temperature sensor, a pressure sensor, an ion specific electrode, a conductivity sensor, and/or an acoustic sensor. Some embodiments of the invention include a processor for processing data collected by the sensor and a transmitter for sending the data from the apparatus to a receiver. In some embodiments, the apparatus is adapted to be disposed within a wellbore.

In still another aspect, the invention relates to a method for sensing a chemical in a sub-surface fluid. The method includes the steps of receiving a sub-surface fluid sample into a sensor apparatus disposed within a sub-surface formation, sensing a chemical in a vapor emitted by the fluid sample within the apparatus, and in response to the sensed chemical, sending a signal to a receiver disposed outside the formation.

In various embodiments, the sub-surface fluid sample is at least one of gas, oil, and water, and particularly crude oil, and the chemical sensed is at least one of a hydrocarbon, water, and hydrogen sulfide. In some embodiments, the fluid sample is passed through in inlet disposed on the apparatus. In some embodiments, the inlet comprises a rotatable wheel having at least one blade, which can be rotated by a power source or by the flow of the sub-surface fluid over the wheel.

In various embodiments, the method may include the steps of purging the apparatus with, for example, nitrogen gas; volatilizing the sub-surface fluid sample; and/or modulating the pressure within the apparatus by, for example, adding a purge fluid (e.g. nitrogen gas) to the chamber. The method may include the step of processing the signal before sending the signal to the receiver.

In some embodiments, the sensor apparatus is adapted to be disposed on a drill string for use within a wellbore, while in other embodiments the sensor apparatus is adapted to be disposed within a drill casing.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 9 is a perspective, cross-sectional view of another alternative embodiment of a sensor apparatus in accordance with the invention that includes an inlet comprising a perforated member;

FIG. 10 is a perspective, partial cut-away view of yet another alternative embodiment of a sensor apparatus in accordance with the invention that includes an inlet comprising a wheel in fluid communication with a semi-permeable membrane;

DESCRIPTION

Embodiments of the present invention are described below. It is, however, expressly noted that the present invention is not limited to these embodiments, but rather the intention is that modifications that are apparent to the person skilled in the art are also included. For example, many of the following embodiments are described with reference to oil wells, however, the present invention can also be applied to other types of wells, such as, for example, water wells and natural gas wells.

Embodiments of the invention can qualitatively and quantitatively characterize wellbore fluids with respect to, for example, chemical composition and physical properties. Generally, a sensor apparatus in accordance with the invention is capable of operating in harsh environments, for example, at elevated temperature and/or pressure, in the presence of caustic liquids, and/or in the presence of abrasive particles.

Figure 1:
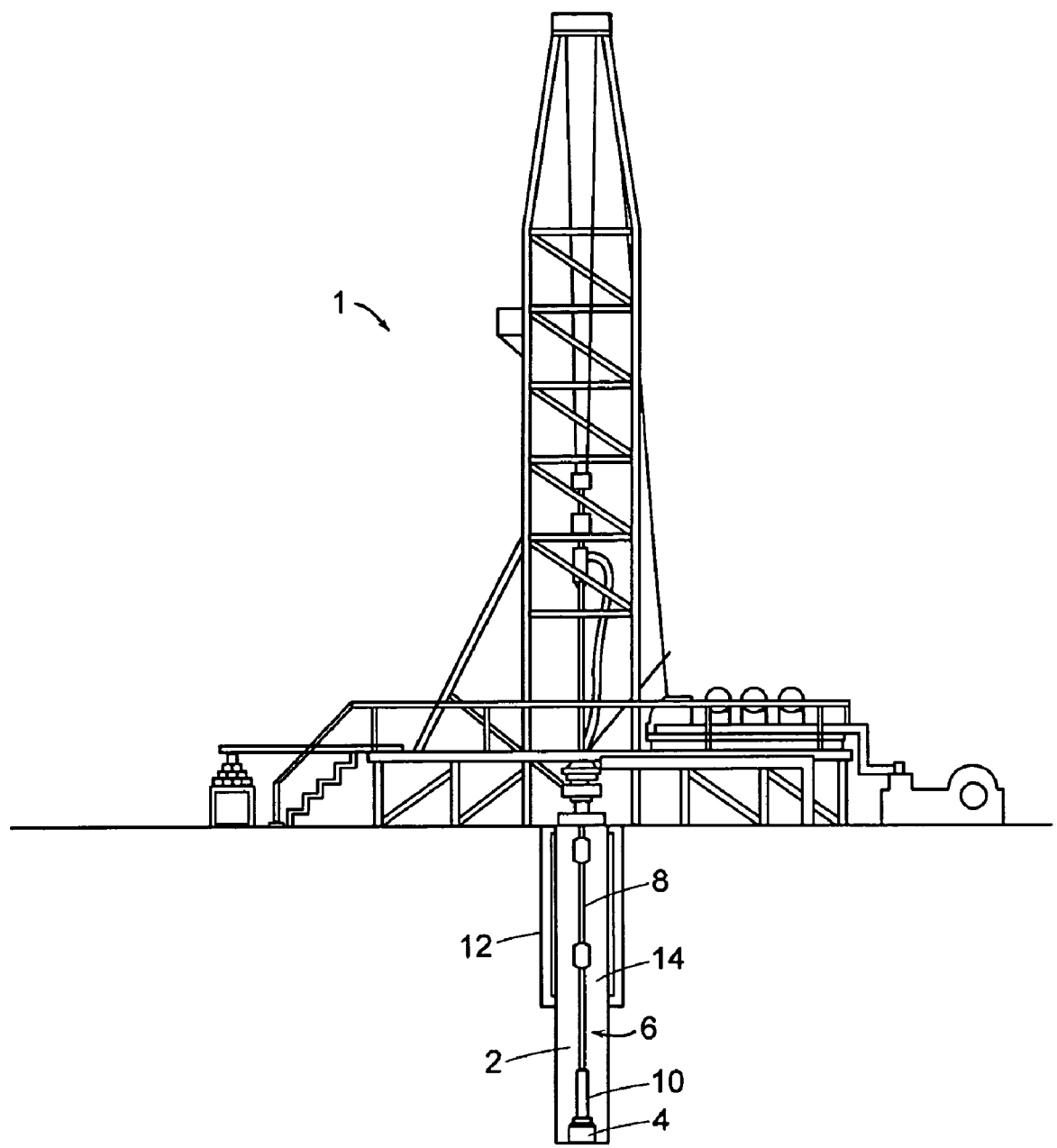
FIG. 1 is a schematic representation of a drilling rig and wellbore.

FIG. 1 is a schematic diagram of an exemplary drilling rig 1. To recover oil and/or gas from sub-surface formations, a wellbore 2 is typically drilled using a drill bit 4 attached to a drill string 6. The drill string 6 includes sections of drill pipe 8 connected end-to-end and at least one drill collar 10, which is a larger diameter, heavier pipe that fits around the drill pipe 8 and places weight on the drill bit 4. Surrounding at least a portion of the drill string 6 is a drill casing 12, which serves to strengthen the wellbore 2 and prevent the wellbore 2 from collapsing in on itself. The drill bit 4 is rotated either by a motor on the surface, which rotates the entire drill string 6, or by a motor located on the drill string 6, which rotates only the drill bit 4. Rock fragments and drilling fluid are carried upward and out of the wellbore 2 though an annulus 14 (i.e., the space between the drill string 6 and the casing 12) by pumping a mixture of chemicals and water known as "mud" through the drill string 6. As the wellbore 2 increases in depth, additional drill pipes 8 are added at the surface to lengthen the drill string 6.

Figure 2:
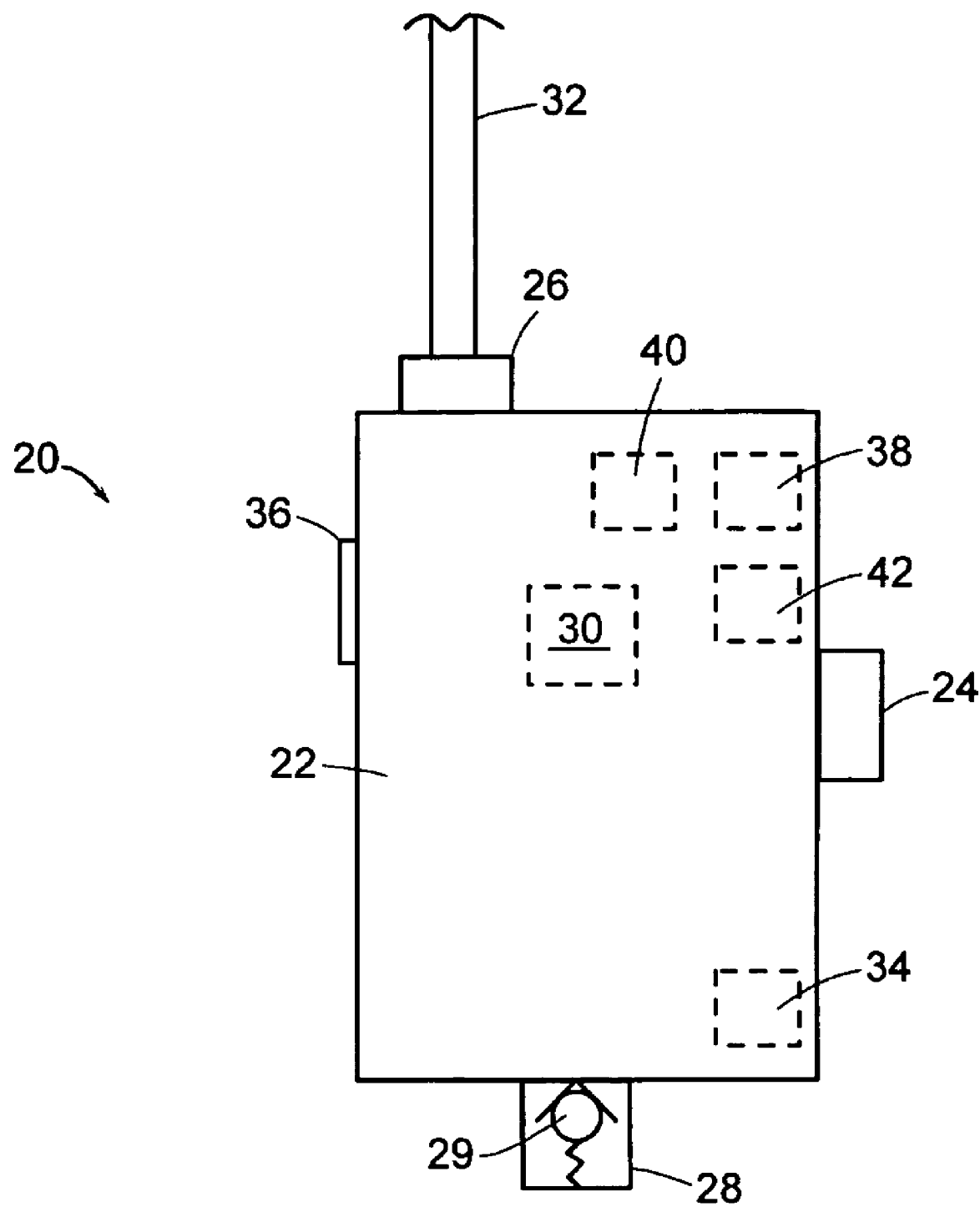
FIG. 2 is a schematic representation of a sensor apparatus in accordance with one embodiment of the invention.

In one aspect, the invention provides a sensor apparatus for use, for example, in a wellbore, such as that described above to sense a chemical in a vapor emitted from a sub-surface fluid. FIG. 2 is a schematic diagram of one embodiment of a sensor apparatus 20 in accordance with the invention. The apparatus 20 includes a chamber 22 having a sample inlet 24, a purge inlet 26, and an outlet 28. The temperature of the chamber 22 can be modulated by, for example, one or more heaters located in or on the chamber 22. A pressure compensator, optionally located on or in the chamber 22 and/or the purge inlet 26, can be used to adjust the pressure within the chamber 22. For example, the pressure can be maintained at or slightly above ambient pressure within the wellbore. The sample inlet 24 passes a controlled amount of a fluid, such as a drilling fluid in a wellbore, into the interior of the chamber 22. The sample inlet 24 also serves to isolate the interior of the chamber 22 from the surrounding environment, which permits the conditions within the interior of the chamber 22 (e.g., temperature and pressure) to be controlled and maintained.

The purge inlet 26 allows a purge fluid to be introduced into the chamber 22 to remove any accumulated drilling fluid and/or volatile compounds in between sampling. The purge fluid can be a liquid or a gas; in a particular embodiment, the purge fluid is nitrogen gas. The purge fluid enters the purge inlet 26 via, for example, a purge fluid line 32, which is connected to a purge fluid source (e.g., a gas cylinder or bottle) located within the wellbore or on the surface. The purge fluid line 32 can be detachably connected to the purge inlet 26, which permits the purge fluid source to be replaced or recharged. Alternatively, the purge fluid line 32 can be permanently connected to the purge inlet 26. The type and size of purge fluid source depends upon, for example, the size of the sensor apparatus 20, the interval between successive purges of the apparatus 20, and the life expectancy of the apparatus 20. For example, in one embodiment, a chamber 22 has an internal volume of 2 cubic inches, and each purge delivers 3 times the chamber volume (i.e., 6 cubic inches) of nitrogen gas to the chamber 22. At 1000 atmospheres of pressure, this embodiment would require about 0.15 pounds of nitrogen per purge. Therefore, if, for example, the sensor apparatus 20 is to be purged a total of 500 times during its lifetime, the purge fluid source must be able to deliver a total of at least 75 pounds of nitrogen gas to the chamber 22 through the purge inlet 26.

The purge fluid can be heated to a desired temperature with heaters optionally located on or in the chamber 22 and/or the purge inlet 26. After the purge fluid enters the chamber 22 via the purge inlet 26, the outlet 28 opens to release the contents of the chamber 22. In some embodiments, the outlet 28 includes a check valve 29, which opens when the pressure within the chamber 22 reaches a specified level.

The chamber 22 can be purged at set time intervals, or in response to a command from an operator. In some embodiments, the chamber 22 is purged in response to conditions within the chamber 22 itself, such as when the pressure or fluid level within the chamber 22 reaches a certain level. A fluid level sensor 34 can be used to detect the level of the fluid within the chamber 22 and send a signal to an operator, who can then order a purge of the chamber 22. Alternatively, the chamber 22 can be purged automatically once the fluid level sensor 34 detects the fluid has reached a specified level. The purge fluid that enters the chamber 22 via the purge inlet 26 can also serve other purposes, including volatilizing the sub-surface fluid sample in the chamber 22 and reducing sensor saturation by modulating the pressure within the chamber 22 with respect to the pressure of the surrounding wellbore.

Disposed on an inside surface of the chamber 22 are one or more vapor sensors 30. In various embodiments, the vapor sensor 30 is located within the chamber 22 such that it is not contacted by the fluid sample entering the chamber 22 through the inlet 24. In one example, the vapor sensor 30 may be mounted on an upper surface of the chamber 22, while the fluid sample is deposited on a lower surface of the chamber 22. One or more components of the fluid sample vaporize inside of the chamber 22 and move throughout the chamber 22 by dispersion. The vapor sensor 30 senses one or more characteristics of the vapor emitted by the fluid sample. For example, a vapor sensor 30 can be a chemical sensor that senses water, pH, hydrocarbons, or hydrogen sulfide. Alternatively, the vapor sensor 30 can be an array of different sensors for measuring the various characteristics of a vapor. The characteristics of the fluid sample that the vapor sensor 30 can determine include, for example, the presence and/or percentage of water, the presence of a gas (e.g., methane), the oil/gas ratio, the aliphatic/aromatic hydrocarbon ratio, and the presence of corrosive or poisonous chemicals (e.g., hydrogen sulfide). Additionally, the vapor sensors 30 can detect the presence and/or concentration of certain chemicals within water, such as, for example, lime, salinity, chloride, calcium, magnesium, potassium, carbonate, and bicarbonate. Any type of vapor sensor 30 known in the art may be disposed on the interior of the chamber 22, including, for example, resistive sensors, ion mobility sensors, and flexural plate wave sensors. Because it is isolated from the harsh environment of the wellbore, a sensor that would otherwise be destroyed under wellbore conditions can be used in a sensor apparatus 20 in accordance with the invention. For example, the vapor sensor 30 can contain a small active sensor (e.g., having a surface area in the range of 0.05 cm$^2$) with a sensitive transduction mechanism, such as a thin film of polymer (e.g., less than 1 micron thick) that has a strong affinity for the analyte of interest.

Although only one vapor sensor 30 is depicted in FIG. 2, any number of vapor sensors capable of sensing any number of chemical and physical characteristics of a sub-surface fluid can be disposed within the chamber 22. Furthermore, although FIG. 2 shows a vapor sensor 30 disposed on only one inside surface of the chamber 22, the vapor sensors 30 can be located on any inside surface, or on multiple inside surfaces, of the chamber 22.

In some embodiments, one or more external sensors 36 are disposed on an outside surface of the chamber 22 and in contact with the wellbore fluid. Any number of external sensors 36 can be placed on the outside of the chamber 22, including, for example, resistive pressure sensors, resistive temperature sensors, ion specific electrodes (e.g., a pH sensor), conductivity sensors, and acoustic sensors. In other embodiments, resistive chemical sensors protected by gas-permeable membranes are mounted externally. The external sensors 36 can sense chemical and/or physical characteristics of the surrounding wellbore fluid and/or the surrounding rock formations, or they can sense physical properties of the drill string and/or drill bit. Although only one external sensor 36 is depicted in FIG. 2, any number of external sensors 36 capable of sensing any number of chemical and physical characteristics can be disposed on an outer surface of the chamber 22.

With continued reference to FIG. 2, a transmitter 38 for sending signals from the sensor apparatus 20 to a receiver can be located on or in the chamber 22. In some embodiments, the transmitter 38 is in electrical communication with the vapor sensors 30 and/or the external sensors 36. The transmitter 38 receives signals from the vapor sensors 30 and/or the external sensors 36 and sends them directly to a receiver on or near the surface. In some embodiments, a processor 40 is in electrical communication with the vapor sensors 30 and/or the external sensors 36 and also with the transmitter 38. The processor 40 receives signals from the vapor sensors 30 and/or the external sensors 36, processes the signals into a conditioned signal, and sends the conditioned signal to the transmitter 38. The transmitter 38 then sends the conditioned signal to the receiver on or near the surface. The processor 40 can be located on or in the chamber 22.

In one embodiment, the transmitter 38 continuously sends a signal to the receiver, for example, a signal corresponding to real-time measurements of the water content or oil/gas ratio of the sub-surface fluid. In other embodiments, the transmitter 38 only sends a signal to the receiver when a certain event occurs, for example, once the water content or oil/gas ratio reaches a certain level. In still other embodiments, the transmitter 38 sends a signal to the receiver at predetermined intervals.

The sensor apparatus 20 may also contain a receiver 42 for receiving signals from an operator at the surface. The receiver 42, which may also be disposed within or outside of the chamber 22, can be in electrical communication with any or all of the sample inlet 24, the purge inlet 26, the outlet 28, the vapor sensors 30, the fluid level sensor 34, the external sensors 36, the transmitter 38, and the processor 40. The receiver 42 can receive a signal from the operator and pass the signal to another component, causing an action within the sensor apparatus 20. For example, the receiver 42 may receive a signal to open the purge inlet 26 or to turn off a particular vapor sensor 30. Thus, the receiver 42 enables an operator at the surface to remotely control one or more functions of the sensor apparatus 20.

Signals can be sent to and from the sensor apparatus 20 using any methods known in the art. For example, the sensor apparatus 20 can be linked to a receiver and/or transmitter on or near the surface via one or more cables. The cables can be disposed inside of the wellbore (e.g., within the annulus along the drill string or drill casing), outside of the wellbore, or within a wall of a drill string or casing. Alternatively, the sensor apparatus 20 communicates with the surface using a wireless communication system. Suitable wireless communication methods include, for example, mud-pulse telemetry, acoustic, and electromagnetic techniques. It should be understood that any communication technique, wireless or not, may be used to facilitate signal transfer between the sensor apparatus 20 and a receiver at or near the surface. Examples of suitable communication systems are disclosed in U.S. Pat. Nos. 6,445,307, 6,467,557, 6,662,110, and 6,552,665, and U.S. Patent Application Publication No. 2003/0042016, the entire disclosures of which are hereby incorporated by reference herein.

Power for operating the various electronic components of the sensor apparatus 20 can be supplied, for example, by a power source, such as a battery, located in or near the chamber 22, a turbine powered by fluid flowing within the wellbore, or a combination of both.

The various components of the sensor apparatus 20 can be manufactured from any material that can withstand prolonged exposure to the wellbore environment. Suitable materials include polymers and metals. Polymeric materials can be used alone or in combination, either with or without reinforcement. Suitable polymeric materials include polyurethanes, such as a thermoplastic polyurethane (TPU), ethyl vinyl acetate (EVA), thermoplastic polyether block amides, thermoplastic olefin, silicones, polyethylenes, polyimides, acetal, and equivalent materials. Reinforcement, if used, may be by inclusion of glass or carbon graphite fibers or para-aramid fibers, such as the Kevlar® brand sold by DuPont, or other similar method. Suitable metals include steel, stainless steel, and aluminum, for example. Also, both polymeric and metallic materials can be used to fabricate the components of the sensor apparatus 20. Other suitable materials will be apparent to those skilled in the art.

Figure 3A:
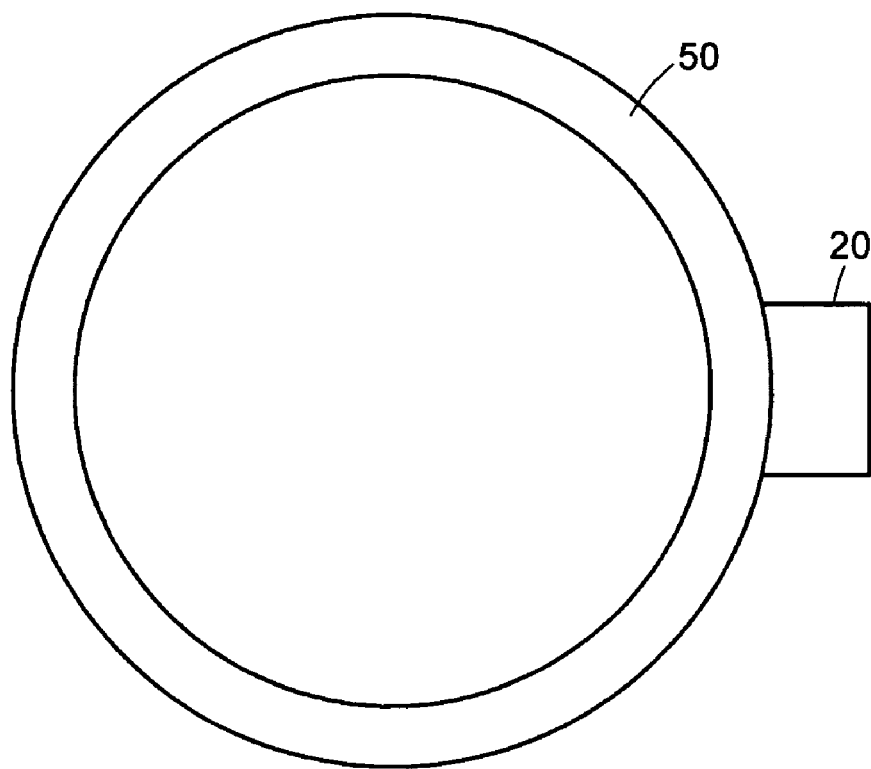
FIG. 3A is a plan view of a sensor apparatus in accordance with one embodiment of the invention disposed on an outer surface of a pipe.
Figure 3B:
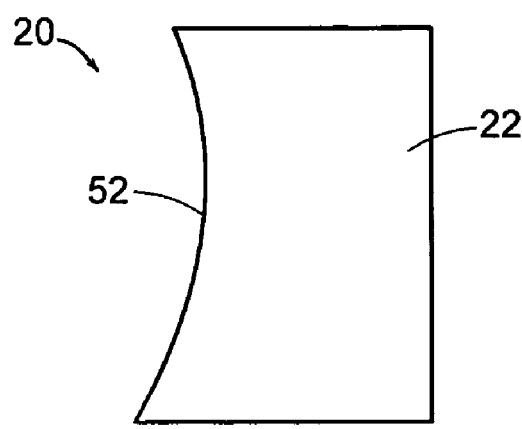
FIG. 3B is an enlarged plan view of the sensor apparatus of FIG. 3A.

In the embodiment depicted in FIGS. 3A and 3B, the sensor apparatus 20 is adapted to be disposed on the outside surface of a round or curved pipe, such as a drill string 50. As illustrated by FIG. 3B, one side 52 of the chamber 22 has a concave shape that substantially corresponds to the exterior of the drill string 50. The remaining sides of the chamber 22 can have any shape to facilitate placement of the sensor apparatus 20 in a desired operating location. The sensor apparatus 20 may be adapted to be disposed on either the drill pipe, the drill collar, or any other portion of the drill string 50.

Figure 4A:
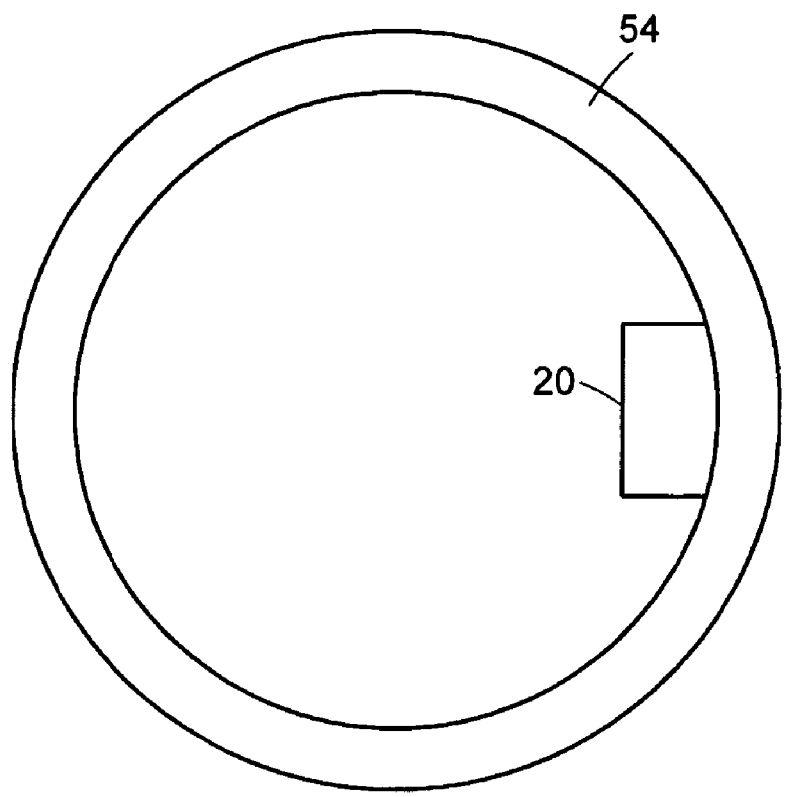
FIG. 4A is a plan view of a sensor apparatus in accordance with one embodiment of the invention disposed on an inner surface of a pipe.
Figure 4B:
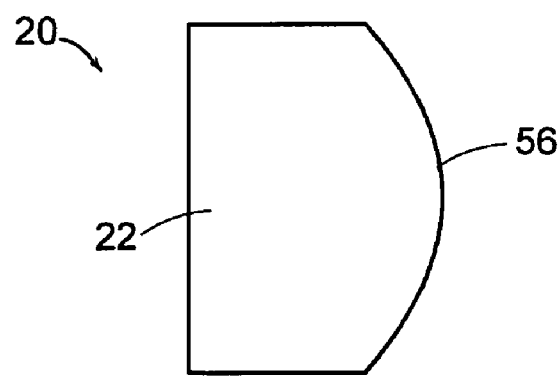
FIG. 4B is an enlarged plan view of the sensor apparatus of FIG. 4A.

Alternatively, the sensor apparatus 20 can be adapted to be disposed on the inside surface of a round or curved pipe, such as, for example, a drill casing 54, as illustrated by FIGS. 4A and 4B. Referring to FIG. 4B, one side 56 of the chamber 22 has a convex shape that substantially corresponds to the interior of the drill casing 54. The remaining sides of the chamber 22 can have any shape to facilitate placement of the sensor apparatus 20 in a desired operating location.

Figure 5A:
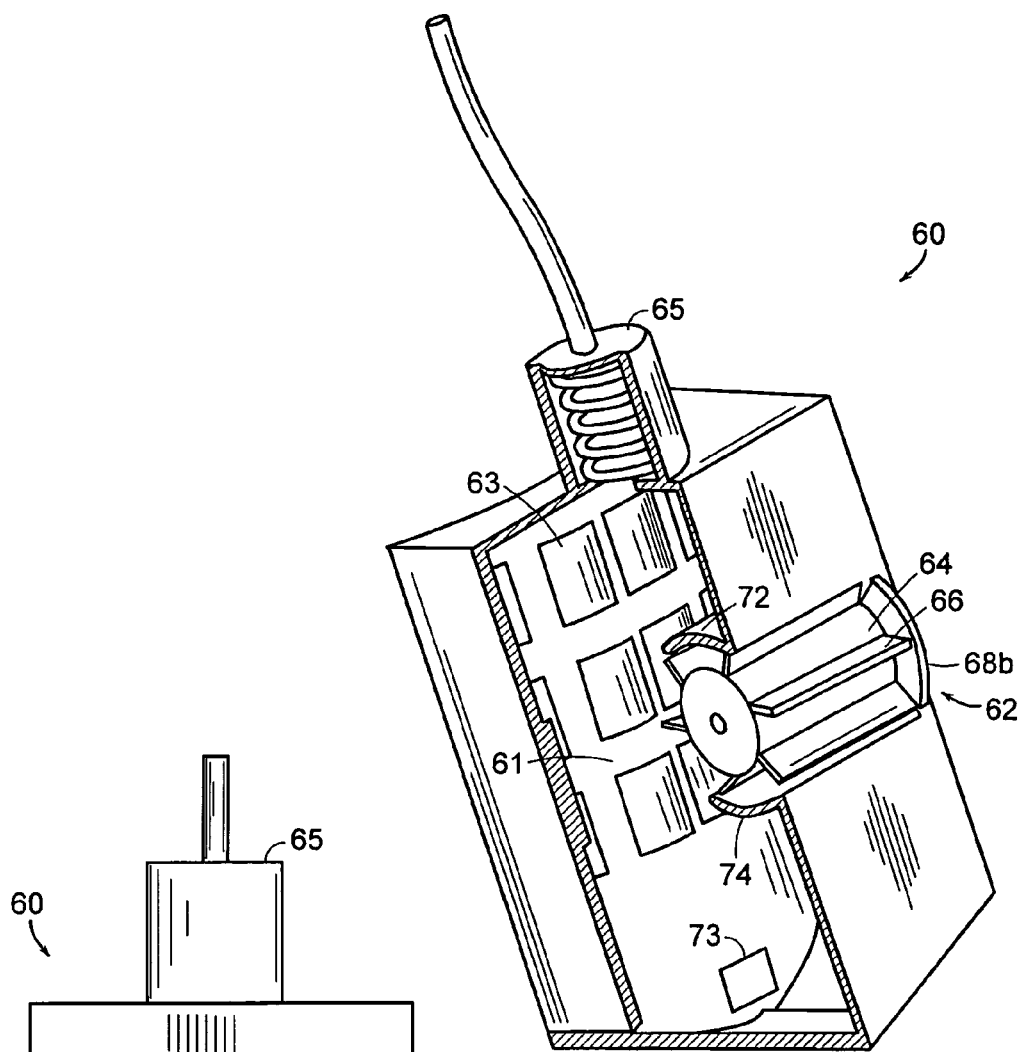
FIG. 5A is a perspective, partial cut-away view of an embodiment of a sensor apparatus in accordance with the invention that includes an inlet comprising one or more blades disposed on a wheel.
Figure 5B:
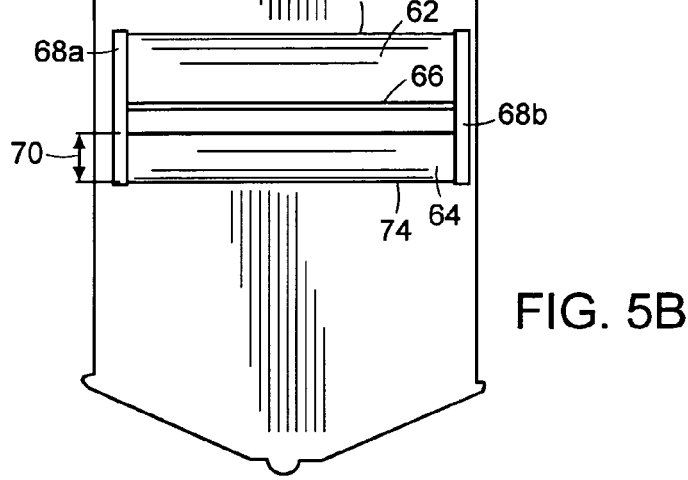
FIG. 5B is a side view of the sensor apparatus of FIG. 5A.

FIGS. 5A and 5B illustrate a particular embodiment of a sensor apparatus 60 in accordance with the invention. The sensor apparatus 60 includes many of the same features described with respect to the schematic diagram of FIG. 2, including a chamber 61, one or more vapor sensors 63 disposed therein, a sample inlet 62, a purge inlet 65, and an outlet 73 disposed on the chamber 61. The sample inlet 62 includes a drum or wheel 64 on which one or more blades 66 are disposed. In a particular embodiment, the blades 66 are made of an elastomeric material. Referring to FIG. 5B, each blade 66 contacts the lateral sides 68a and 68b of the inlet 62. In addition, each blade 66 is of sufficient height to span the gap 70 between the wheel 64 and the top and bottom edges 72, 74 of the inlet 62. The blades 66 can have a curved shape, as illustrated in FIGS. 6A–6C, or the blades 66 can have a substantially linear shape.

Figure 6A:
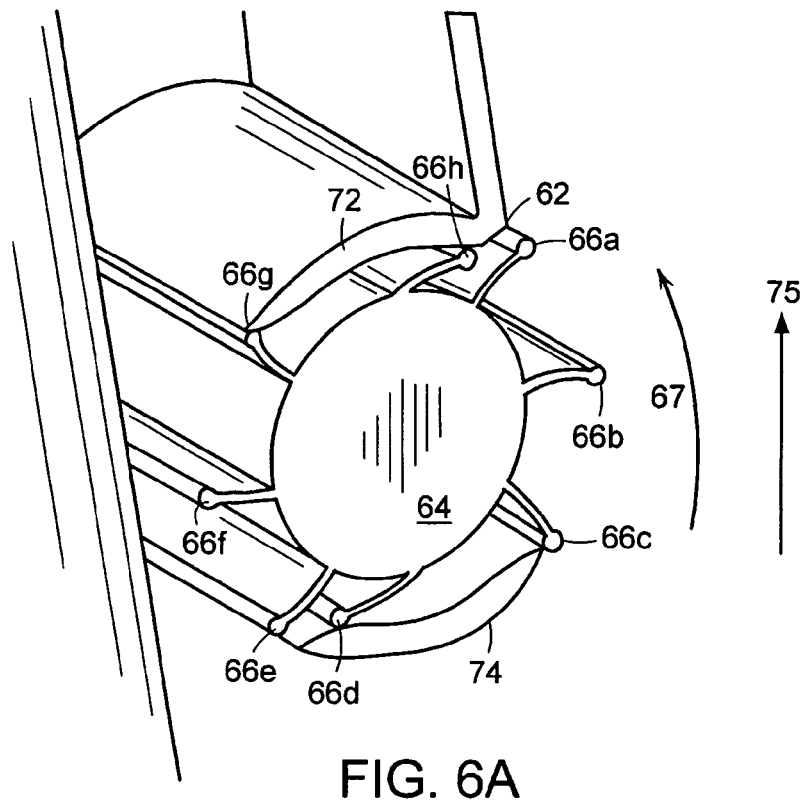
FIGS. 6A–6C are perspective views of the inlet of the apparatus of FIGS. 5A–5B, during various stages of sampling.
Figure 6B:
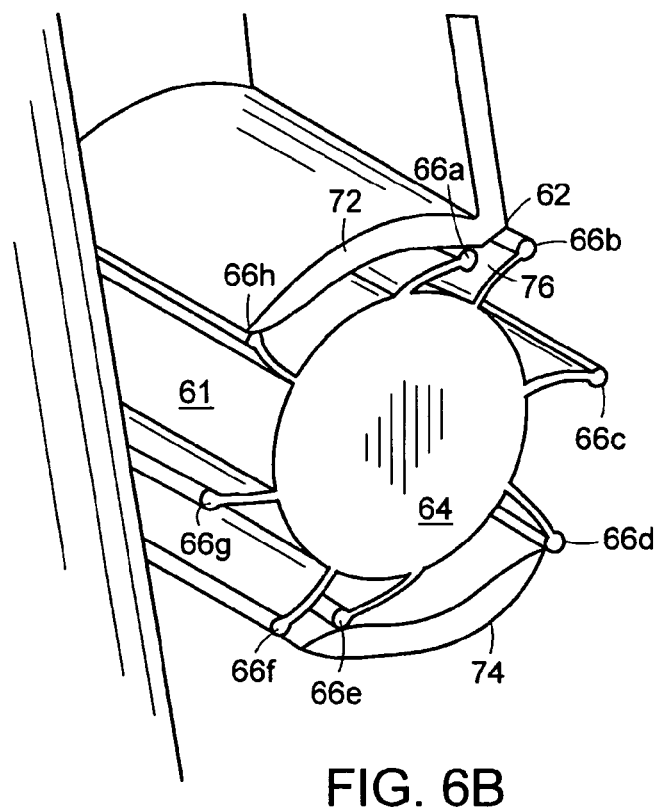
Figure 6C:
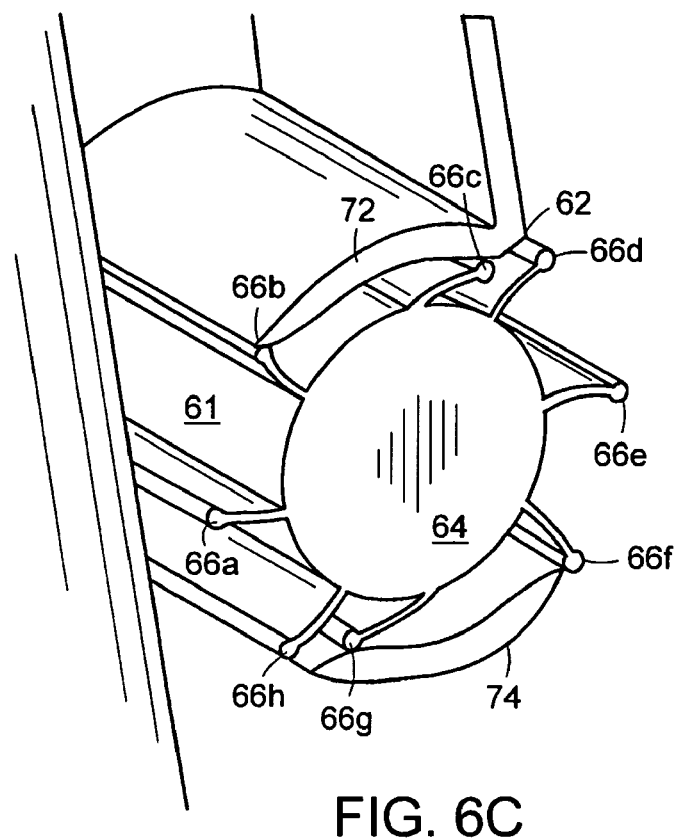

FIGS. 6A–6C depict the wheel 64 during various stages of operation. In the embodiment illustrated by FIG. 6A, eight blades 66a–66h are disposed on the wheel 64. As the wheel 64 rotates in the direction indicated by arrow 67, an amount of drilling fluid is carried in between blade 66a and blade 66b toward the top edge 72 of the inlet 62. Due to its elastomeric nature, as blade 66a contacts the top edge 72, blade 66a bends back toward blade 66b, which effectively drives out a portion of the fluid carried between blades 66a and 66b. As illustrated by FIG. 6B, as the wheel 64 continues to rotate, blade 66b also comes into contact with the top edge 72, which creates a volume 76 bounded by the wheel 64, blades 66a and 66b, the top edge 72, and the lateral sides 68a and 68b of the inlet 62. Trapped within the volume 76 is a controlled amount of a fluid sample isolated from the surrounding environment. As the wheel 64 continues to rotate, blade 66a is moved into the interior of the chamber 61 and no longer contacts the top edge 72, as shown in FIG. 6C. At this point, the forces that bent blade 66a are removed, so blade 66a is free to revert back to its original conformation. As a result, the fluid sample trapped in the volume 76 is deposited into the interior of the chamber 61. This process is repeated for each blade 66 as the wheel 64 rotates, with each blade 66 depositing a controlled amount of a fluid sample in the interior of the chamber 61.

In some embodiments, the fluid sample is a film deposited on the blade 66. For example, as the wheel 64 rotates and moves the blade 66a across the top edge 72 of the inlet 62, as illustrated by FIG. 6B, a substantial portion of the fluid carried between the blades 66a and 66b is removed as described above, leaving only a film on the blade 66a. In another embodiment, the blades 66 are curved so that little or no fluid is carried between the blades 66a and 66b and only a film of the fluid id deposited on the blade 66a.

Referring again to FIG. 6B, while the blades 66a and 66b are in contact with the top edge 72 of the inlet 62, at least one other blade 66 (e.g., blade 66e in FIG. 6B) is in contact with the bottom edge 74 of the inlet 62. As described above, the elastomeric nature of the blade 66e causes it to bend as it contacts the bottom edge 74, which creates a seal between the wheel 64, the bottom edge 74, and the lateral sides 68a and 68b of the inlet 62. At all times during the operation of the sensor apparatus 60, at least one, and preferably more than one, blade 66 should independently contact the top edge 72 and the bottom edge 74 of the inlet 62 in order to effectively isolate the interior of the chamber 61 from the surrounding wellbore environment.

Although FIGS. 6A–6C illustrate an inlet wheel 64 with eight blades 66a–66h, any number of blades 66 can be disposed on the wheel 64 as long as the dual requirements of controlling the amount of sample fluid passed into the chamber 61 and isolating the interior of the chamber 61 from the surrounding environment are met. The amount of sample deposited within the chamber 61 can be controlled by varying the number of blades 66 disposed on the wheel 64 and/or by varying the distance between each blade 66 along the wheel 64. The size of the gap 70 between the wheel 64 and the top and bottom edges 72, 74 of the inlet 62 can also be varied, as can the height of each blade 66.

Figure 7A:
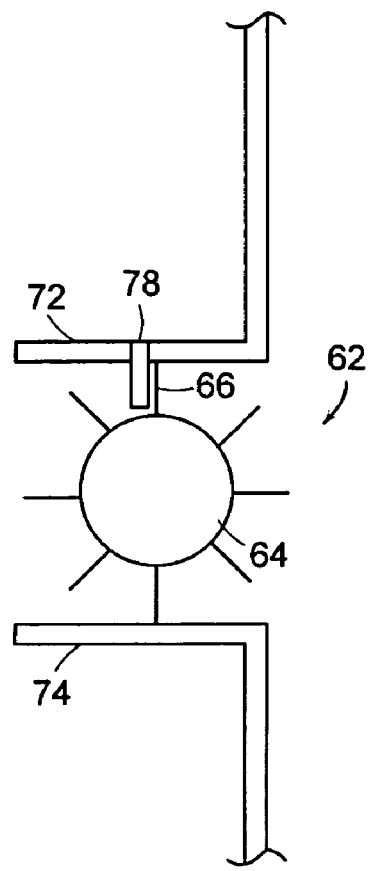
FIGS. 7A and 7B are side cross-sectional views of an inlet of a sensor apparatus in accordance with the invention that includes a protrusion in addition to one or more blades disposed on a wheel.
Figure 7B:
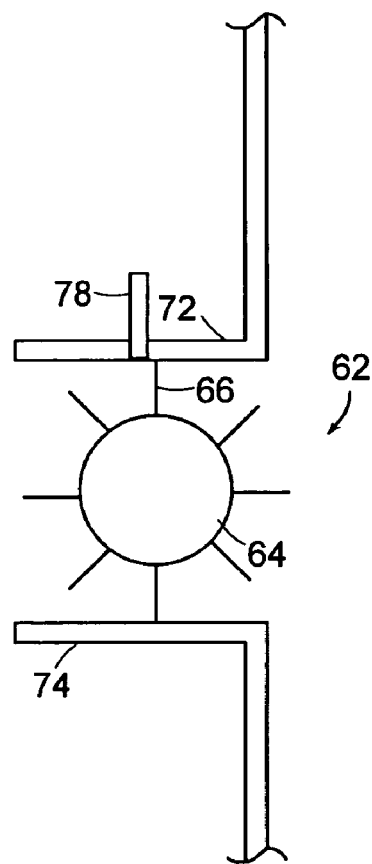

In some embodiments, a motor located in, on, or adjacent to the chamber 61 rotates the wheel 64. In other embodiments, the wheel 64 is rotated by the flow of the sub-surface fluid over the blades 66, as indicated by arrow 75 in FIG. 6A. The wheel 64 can be rotated constantly or can be incremented on command or at set intervals to deposit a fluid sample within the chamber 61. In some embodiments, the inlet 62 and/or the wheel 64 contain a means for controlling the interval of the rotation of the wheel 64. For example, the top edge 72 of the inlet 62 may contain a protrusion 78 that contacts the blades 66 and impedes or stops the rotation of the wheel 64, as illustrated by FIG. 7A. In some embodiments, the protrusion 78 is movable, and the wheel 64 cannot rotate until the protrusion 78 is moved out of the path of the blades 66, as illustrated by FIG. 7B. In other embodiments, the protrusion 78 is not movable, and the blades 66 bend as they contact the protrusion 78, slowing but never stopping the rotation of the wheel 64. The protrusion 78 can be located anywhere on the top edge 72 of the inlet 62, or the protrusion 78 can be located on the bottom edge 74 of the inlet 62. Any means for controlling the rotation of a wheel 64 known in the art, including, for example, a ratchet-type system, can be used in accordance with the invention.

The blades 66 can be made of any elastomeric material that can maintain its elasticity and resist abrasion and corrosion under the harsh environmental conditions present in a wellbore. In some embodiments, the wheel 64 is made of the same material as the blades 66, and the two can be fabricated together as a single unit by, for example, a die or injection molding process. In other embodiments, the wheel 64 and the blades 66 are made of different materials. In these cases, the blades 66 must be affixed to the wheel 64 by, for example, fasteners, using a liquid epoxy or a hot melt adhesive, such as EVA. In addition to adhesive bonding, the wheel 64 and the blades 66 can be solvent bonded, which entails using a solvent to facilitate fusing of the components.

Figure 8:
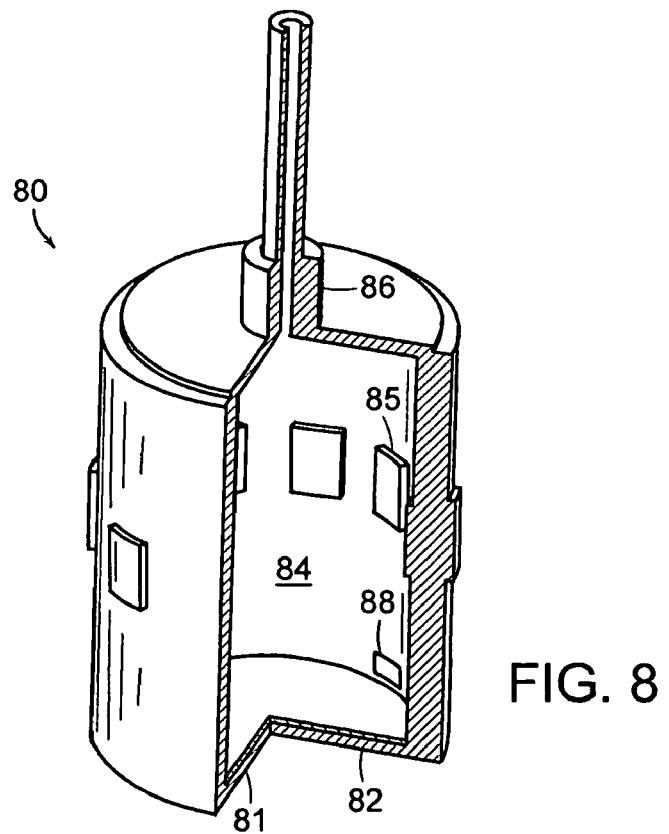
FIG. 8 is a perspective, partial cut-away view of an alternative embodiment of a sensor apparatus in accordance with the invention that includes an inlet comprising a semi-permeable membrane.

Alternative embodiments of sensor apparatus having different types of sample inlets are illustrated by FIGS. 8–12. FIG. 8 shows a sensor apparatus 80 wherein the sample inlet 81 includes a semi-permeable membrane 82. In one embodiment, the semi-permeable membrane 82 prevents fluids from the surrounding environment from entering the chamber 84, but allows vapors to enter the chamber 84 where they come into contact with one or more vapor sensors 85 disposed on an inside surface of chamber 84. In other embodiments, the semi-permeable membrane 82 allows controlled amounts of specified fluids (e.g., hydrocarbons) to enter the chamber 84. In the embodiment illustrated by FIG. 8, the semi-permeable membrane 82 covers an entire surface of the chamber 84; however, in other embodiments, the semi-permeable membrane 82 covers only a portion of a surface, or portions of more than one surface, of the chamber 84.

A purge fluid, such as nitrogen gas, enters the chamber 84 through the purge inlet 86. The purge fluid serves to modulate the pressure within the chamber 84, in order to control the vapors and/or fluids entering chamber 84 through membrane 82 by, for example, balancing the pressure within the chamber with the pressure of the environment surrounding the chamber 84. The purge fluid can also be used to drive the contents of the chamber 84 through an outlet 88, which can include a check valve, as described above.

In the sensor apparatus 90 illustrated in FIG. 9, a perforated member 92 replaces the semi-permeable membrane 82 shown in FIG. 8. The perforated member 92 contains holes 94 that are small enough to prevent an appreciable amount of wellbore fluid from entering the chamber 96. The sensor apparatus 90 should be oriented within a wellbore such that the perforated member 92 is not perpendicular to the flow of fluid within the wellbore, and in certain embodiments, the sensor apparatus 90 is oriented within a wellbore such that the perforated member 92 is substantially parallel to the fluid flow. A purge fluid enters the chamber 96 through a purge inlet 98 to modulate the pressure within the chamber 96 and control the fluids/vapors entering the chamber 96 through the perforated member 92.

FIG. 10 illustrates yet another alternative embodiment of a downhole sensor apparatus 100 in accordance with the invention. In this embodiment, a sample inlet 102 includes a wheel 104 and an inner surface 105. At least a portion of the inner surface 105 is made of a semi-permeable membrane 106. The wheel 104 contains at least one notch 108 for capturing a fluid sample. To begin sampling, a motor rotates the wheel 104 such that the notch 108 contacts the surrounding wellbore fluid. The motor continues to rotate the wheel 104 until the notch 108 no longer contacts the surrounding fluid, trapping a sample of the fluid between the notch 108 and the semi-permeable membrane 106. The semi-permeable membrane 106 allows vapors or controlled amounts of specified fluids (e.g., hydrocarbons) from the fluid sample to enter the chamber 110, where one or more chemical characteristics of the vapors are sensed by one or more vapor sensors 112, as described above. A purge inlet 114 and an outlet 116 serve to control the internal pressure and periodically purge the contents of the chamber 110, as described above.

In some embodiments, the rotation of the wheel 104 is stopped for a predetermined interval once the notch 108 is in a position adjacent to the semi-permeable membrane 106. After the predetermined interval, the motor rotates the wheel 104 until the notch 108 again contacts the surrounding wellbore fluid, releasing the fluid sample into the surrounding environment. In other embodiments, the wheel 104 is continuously rotating.

Figure 11:
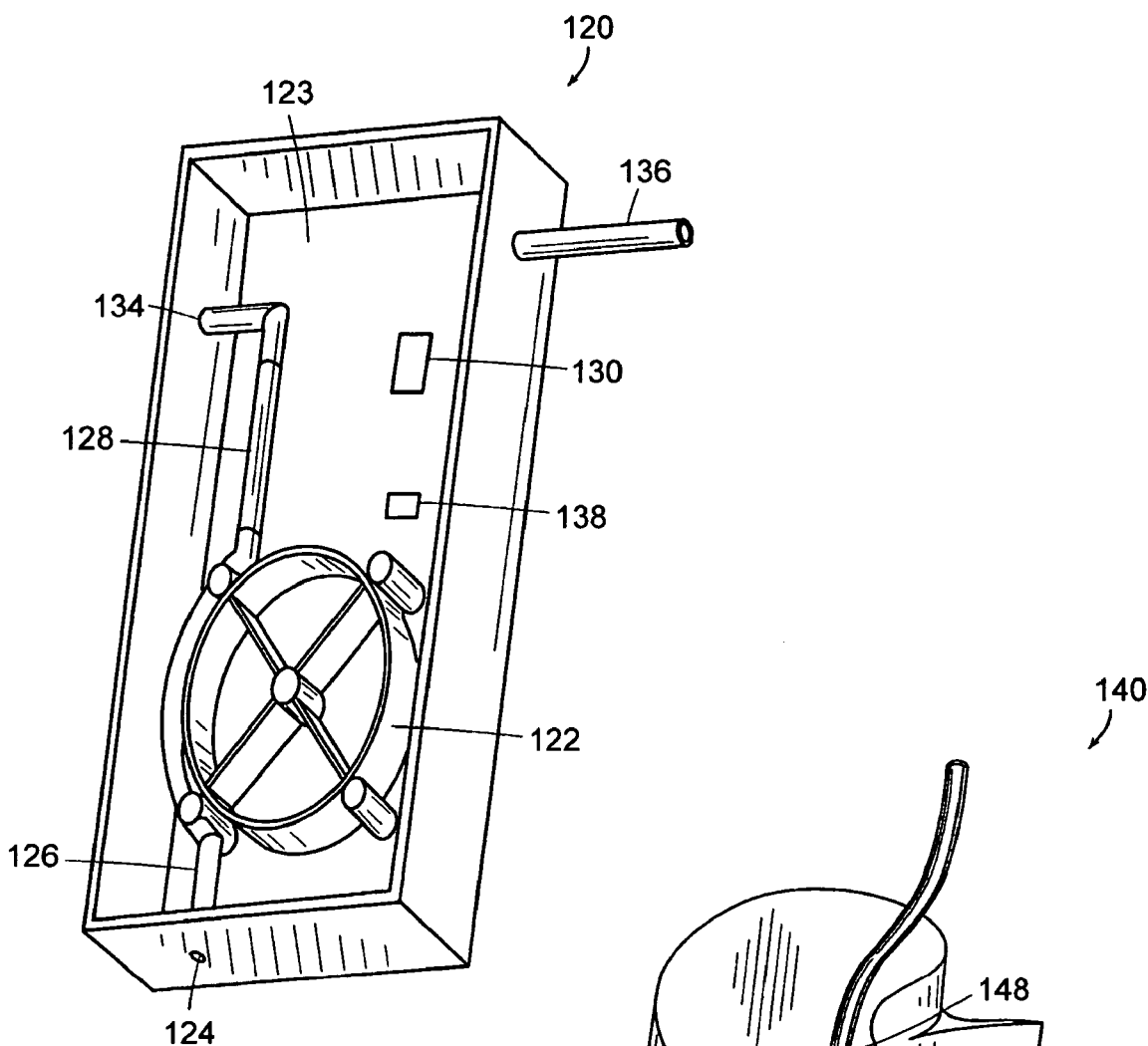
FIG. 11 is a perspective, cross-sectional view of still another alternative embodiment of a sensor apparatus in accordance with the invention that includes an inlet comprising a peristaltic pump in fluid communication with a semi-permeable membrane.

FIG. 11 illustrates still another alternative embodiment of a sensor apparatus 120, which includes a peristaltic pump 122 disposed in a chamber 123. Wellbore fluid enters a sample inlet 124 and flows into a tube 126. The peristaltic pump 122 moves the fluid through the tube 126 at a specified rate. At least a portion of the tube 126 after the peristaltic pump 122 includes a semi-permeable membrane 128, similar to the membranes discussed above. Vapors pass through the semi-permeable membrane 128 into the chamber 123 and are sensed by one or more vapor sensors 130 disposed in the chamber 123. The peristaltic pump 122 continues to move the fluid sample in the tube 126 past the semi-permeable membrane 128 and out through a sample outlet 134 into the surrounding environment. A purge inlet 136 and an additional outlet 138 serve to control the internal pressure and periodically purge the contents of the chamber 123, as described above.

Figure 12:
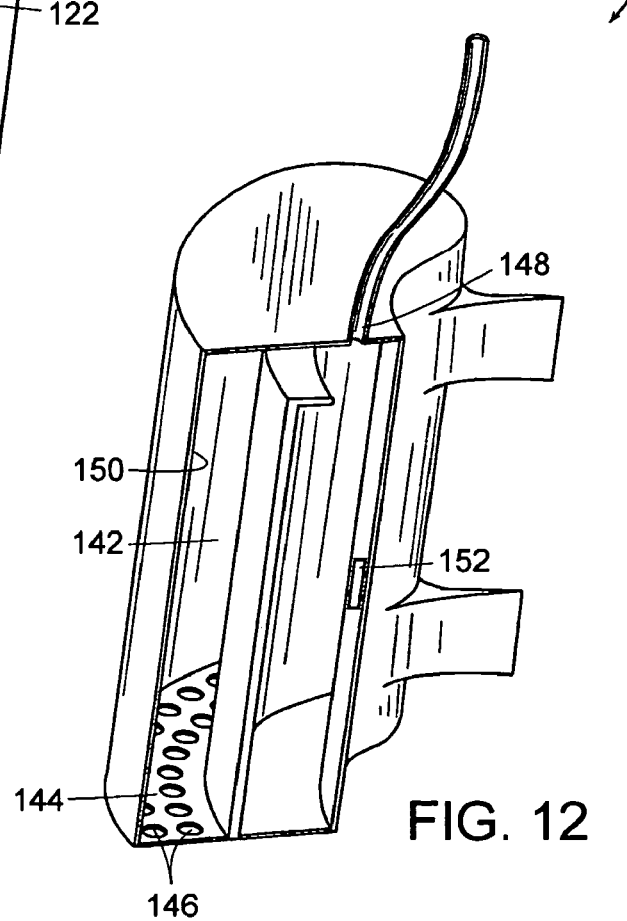
FIG. 12 is a perspective, cross-sectional view of another embodiment of a sensor apparatus in accordance with the invention adapted for use on a drill string that includes an inlet comprising a perforated member.

FIG. 12 illustrates yet another alternative embodiment of a sensor apparatus 140 that is adapted for use on a rotating drill string within a wellbore. Wellbore fluid enters a chamber 142 through a perforated member 144, which contains one or more holes 146. The holes 146 are of sufficient size to limit the amount of fluid that enters the chamber 142. In addition, introduction of a purge fluid through a purge inlet 148 modulates the internal pressure of the chamber 142 and regulates the amount of fluid that can enter the chamber 142 through the perforated member 144. The centripetal force generated by the rotating drill string forces the fluid toward the outer interior surface 150 of the chamber 142. One or more vapor sensors 152 located on an interior surface of the chamber 142 sense a chemical characteristic of the vapors emitted by the fluid in the chamber 142. Preferably, the vapor sensors 152 do not come in contact with the fluid sample in the chamber 142.

In another aspect, the invention provides a system for sensing a chemical in a sub-surface fluid. In one embodiment, the system includes a drill string and a sensor apparatus in accordance with the invention. In another embodiment, the system includes a drill casing and a sensor apparatus in accordance with the invention. The drill string or casing can be modified to accept the sensor apparatus by, for example, forming a groove or space in the drill string or casing into which the sensor apparatus may be positioned. In other embodiments, the sensor apparatus is adapted to fit onto an unmodified drill string or casing. The sensor apparatus can be attached to the drill string or casing by any means known in the art, for example, by a fastener, such as a bolt or screw, an adhesive, or by welding. Furthermore, the sensor apparatus can be permanently attached to the drill string or casing, or it can be detachable.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. An apparatus for sensing a chemical in a sub-surface fluid, comprising:
   a chamber;
   a first inlet disposed on the chamber for passing a sub-surface fluid sample into the chamber; and
   at least one sensor disposed within the chamber and isolated from the first inlet and the sub-surface fluid sample, the sensor being capable of sensing a chemical in a vapor emitted by the sub-surface fluid sample, wherein the first inlet comprises a rotatable wheel, the wheel comprising at least one blade sealing against a surface of the inlet to isolate the sensor from the inlet.

2. The apparatus of claim 1, further comprising an outlet disposed on the chamber.

3. The apparatus of claim 2, wherein the outlet comprises a check valve.

4. The apparatus of claim 1, further comprising a second inlet disposed on the chamber for passing a purging fluid into the chamber.

5. The apparatus of claim 4, wherein the purging fluid is a gas.

6. The apparatus of claim 5, wherein the gas is nitrogen.

7. The apparatus of claim 4, further comprising a gas source in fluid communication with the second inlet.

8. The apparatus of claim 1, wherein the sensor comprises at least one of a hydrocarbon sensor, a water sensor, a pH sensor, and a hydrogen sulfide sensor.

9. The apparatus of claim 1, further comprising a fluid level sensor disposed within the chamber.

10. The apparatus of claim 1, further comprising a power source for rotating the wheel.

11. The apparatus of claim 1, wherein the first inlet comprises a valve.

12. The apparatus of claim 1, further comprising at least one sensor disposed outside the chamber.

13. The apparatus of claim 12, wherein the sensor disposed outside the chamber is selected from the group consisting of a temperature sensor, a pressure sensor, an ion specific electrode, a conductivity sensor, and an acoustic sensor.

14. The apparatus of claim 1, further comprising a processor for processing data collected by the sensor.

15. The apparatus of claim 14, further comprising a transmitter for sending the data from the apparatus to a receiver.

16. The apparatus of claim 1, wherein the apparatus is configured to be disposed within a wellbore.

17. The apparatus of claim 1, wherein the sub-surface fluid sample comprises at least one member of the group consisting of gas, oil, and water and the sensor is capable of sensing a vapor therefrom.

18. The apparatus of claim 1, wherein the sub-surface fluid sample comprises crude oil and the sensor is capable of sensing a vapor therefrom.

19. A method for sensing a chemical in a sub-surface fluid, comprising the steps of:
   receiving a sub-surface fluid sample into a sensor apparatus disposed within a sub-surface formation;
   sensing a chemical in a vapor emitted by the fluid sample within the apparatus; and
   in response to the sensed chemical, sending a signal to a receiver disposed outside the formation, wherein the fluid sample is passed through an inlet disposed on the apparatus, the inlet comprising a rotatable wheel, the wheel comprising at least one blade sealing against a surface of the inlet to isolate an interior of the sensing apparatus from the inlet.

20. The method of claim 19, further comprising the step of volatilizing the sub-surface fluid sample.

21. The method of claim 19, wherein the sub-surface fluid sample comprises at least one member of the group consisting of gas, oil, and water.

22. The method of claim 19, wherein the sub-surface fluid sample comprises crude oil.

23. The method of claim 19, wherein the chemical comprises at least one of a hydrocarbon, hydrogen sulfide, and water.

24. The method of claim 19, further comprising the step of purging the apparatus.

25. The method of claim 19, further comprising the step of processing the signal before sending the signal to the receiver.

26. The method of claim 19, wherein the wheel is rotated by a power source.

27. The method of claim 19, wherein the wheel is rotated by the flow of the sub-surface fluid over the wheel.

28. The method of claim 19, wherein the sensor apparatus is adapted to be disposed on a drill string within a wellbore.

29. The method of claim 19, wherein the sensor apparatus is adapted to be disposed on a drill casing within a wellbore.

30. The method of claim 19, further comprising the step of modulating the pressure within the sensor apparatus.

31. The method of claim 30, wherein the step of modulating the pressure comprises adding a purging fluid to the sensor apparatus.

32. The method of claim 31, wherein the fluid is a gas.

33. The method of claim 32, wherein the gas is nitrogen.

34. The method of claim 19, further comprising the steps of providing a sensor to perform the sensing step and isolating the sub-surface fluid from the sensor.

35. A system for sensing a chemical in a sub-surface fluid, comprising:
 a drill string; and
 an apparatus disposed on the drill string for sensing a chemical in a sub-surface fluid, the apparatus comprising:
  a chamber;
  a first inlet disposed on the chamber for passing a fluid sample into the chamber; and
  at least one sensor disposed within the chamber and isolated from the first inlet and the fluid sample, the sensor being capable of sensing a chemical in a vapor emitted by the fluid sample, wherein the first inlet of the apparatus comprises a rotatable wheel, the wheel comprising at least one blade sealing against a surface of the inlet to isolate the sensor from the inlet.

36. The system of claim 35, wherein the apparatus further comprises an outlet disposed on the chamber.

37. The system of claim 36, wherein the outlet comprises a check valve.

38. The system of claim 35, wherein the apparatus further comprises a second inlet disposed on the chamber for passing a purging fluid into the chamber.

39. The system of claim 35, wherein the apparatus further comprises a gas source in fluid communication with the second inlet.

40. The system of claim 35, wherein the sensor comprises at least one of a hydrocarbon sensor, a water sensor, a pH sensor, and a hydrogen sulfide sensor.

41. The system of claim 35, further comprising a power source for rotating the wheel.

42. The system of claim 35, wherein the first inlet comprises a valve.

43. The system of claim 35, further comprising at least one sensor disposed outside the chamber of the apparatus.

44. The system of claim 43, wherein the sensor disposed outside the chamber is selected from the group consisting of a temperature sensor, a pressure sensor, an ion specific electrode, a conductivity sensor, and an acoustic sensor.

45. The system of claim 35, further comprising a processor for processing data collected by the sensor.

46. The system of claim 44, further comprising a transmitter for sending the data from the apparatus to a receiver.

* * * * *